(12) United States Patent
Greiffenhagen et al.

(10) Patent No.: US 7,006,950 B1
(45) Date of Patent: Feb. 28, 2006

(54) STATISTICAL MODELING AND PERFORMANCE CHARACTERIZATION OF A REAL-TIME DUAL CAMERA SURVEILLANCE SYSTEM

(75) Inventors: Michael Greiffenhagen, Plainsboro, NJ (US); Visvanathan Ramesh, Plainsboro, NJ (US); Dorin Comaniciu, Piscataway, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 81 days.

(21) Appl. No.: 09/592,532

(22) Filed: Jun. 12, 2000

(51) Int. Cl.
*G06F 7/60* (2006.01)
*G06F 17/10* (2006.01)
*G06F 101/00* (2006.01)

(52) U.S. Cl. .............................. 703/2; 703/6; 382/107; 382/228

(58) Field of Classification Search ................ 703/1–2, 703/6; 382/107, 228
See application file for complete search history.

(56) References Cited

U.S. PATENT DOCUMENTS

| | | | | |
|---|---|---|---|---|
| 6,188,776 B1 * | 2/2001 | Covell et al. | ............... | 382/100 |
| 6,188,777 B1 * | 2/2001 | Darrell et al. | ............... | 382/103 |
| 6,353,679 B1 * | 3/2002 | Cham et al. | ................ | 382/228 |

OTHER PUBLICATIONS

Oliver et al, "A Bayesian Computer Vision System for Modeling Human Interactions," M.I.T. Media Laboratory Perceptual Computing Section Technical Report No. 459 (1998)(paper available at: http://citeseer.nj.nec.com/oliver99bayesian.html).*

Cui et al, "Indoor Monitoring Via the Collaboration Between a Peripheral Sensor and Foveal Sensor," Proceedings of the 1998 IEEE Workshop on Visual Surveillance, pp. 2-9 (Jan. 1998).*

Oliver et al, "LAFTER: Lips and Face Real Time Tracker," Proceedings of the 1997 IEEE Computer Society Conference on Computer Vision and Pattern Recognition, pp. 123-129 (Jun. 1997).*

Hunke et al, "Face Locating and Tracking for Human-Computer Interaction," 28th Asilomar Conference on Signals, Systems and Computers at Monterey (1994)(paper available at: http://citeseer.nj.nec.com/hunke94face.html).*

T. Kanada, et al., *Advances in Cooperative Multi-Sensor Video Surveillance*, Proceedings of the DARPA Image Understanding Workshop, vol. 1, pp. 3-24, 1998.

C. Stauffer, et al., *Adaptive Background Mixture Models for Real-Time Tracking*, IEEE, 1999.

(Continued)

*Primary Examiner*—Samuel Broda, Esq.
(74) *Attorney, Agent, or Firm*—Donald B. Paschburg; F. Chau & Associates, LLC

(57) ABSTRACT

The present invention relates to a method for visually detecting and tracking an object through a space. The method chooses modules for a restricting a search function within the space to regions with a high probability of significant change, the search function operating on images supplied by a camera. The method also derives statistical models for errors, including quantifying an indexing step performed by an indexing module, and tuning system parameters. Further the method applies a likelihood model for candidate hypothesis evaluation and object parameters estimation for locating the object.

15 Claims, 3 Drawing Sheets

OTHER PUBLICATIONS

Machine Vision and Applications, International Journal, Special Issue on Performance Evaluation, ed. by W. Forstner, vol. 9, Nos. 5/6, 1997, (table of contents).

S. Nayar, *Omnidirectional Video Camera,* Proceedings of the DARPA Image Understanding Workshop, vol. 1, pp. 235-242, 1997.

V. Ramesh, et al., *Computer Vision Performance Characterization,* RADIUS: Image Understanding for Imagery Intelligence, edited by O. Firschein and T. Strat, Morgan Kaufmann Publishers, San Francisco, 1997.

P. Allen et al., *Two Sensors are Better Than One: Example of Vision and Touch,* Proceedings of 3rd International Symposium on Robotics Research, pp. 48-55, Gouvieux, France, 1986.

K. Cho, et al., *Performance Assessment Through Bootstrap,* IEEE Trans. Pattern Anal. Machine Intell., 19, pp. 1185-1198, 1997.

R. Haralick, *Overview: Computer Vision Performance Characterization,* Proceedings of the DARPA Image Understand Workshop, vol. 1, pp. 663-665, 1994.

S. Nayar et al., *Omnidirectional Vision Systems: 1998 PI Report,* Proceedings of the DARPA Image Understanding Workshop, vol. 1, pp. 93-100, 1998.

Y. Amit, et al., *A Computational Model for Visual Selection,* Neural Computation, vol. 11, pp. 1691-1715, 1999.

S. Wang et al., *Generic, Model-Based Estimation and Detection of Discontinuities in Image Surfaces,* Proceedings of the ARPA IU Workshop, 1994, vol. 2, pp. 1443-1450.

* cited by examiner

STATISTICAL MODELING AND PERFORMANCE CHARACTERIZATION OF A REAL-TIME DUAL CAMERA SURVEILLANCE SYSTEM

BACKGROUND OF THE INVENTION

1. Field of the Invention

The present invention relates to computer vision systems, more particularly to a system having computationally efficient real-time object detection, tracking, and zooming capabilities.

2. Description of Prior Art

Recent advancements in processing and sensing performances are facilitating increased development of real-time video surveillance and monitoring systems.

The development of computer vision systems that meet application specific computational and accuracy needs are important to the deployment of real-life computer vision systems. Such a computer vision system has not yet been realized.

Past works have addressed methodological issues and have demonstrated performance analysis of components and systems. However, it is still an art to engineer systems that meet given application needs in terms of computational speed and accuracy. The trend in the art is to emphasize statistical learning methods, more particularly Bayesian methods for solving computer vision problems. However, there still exists the problem of choosing the right statistical likelihood model and the right priors to suit the needs of an application. Moreover, it is still computationally difficult to satisfy real-time application needs.

Sequential decomposition of the total task into manageable sub-tasks (with reasonable computational complexity) and the introduction of pruning thresholds is one method to solve the problem. Yet, this introduces additional problems because of the difficulty in approximating the probability distributions of observables at the final step of the system so that Bayesian inference is plausible. This approach to perceptual Bayesian is described, for example, in V. Ramesh et al., "Computer Vision Performance Characterization," RADIUS: Image Understanding for Imagery Intelligence, edited by, O. Firschein and T. Strat, Morgan Kaufmann Publishers, San Francisco, 1997, incorporated herein by reference, and W. Mann and T. Binford, "Probabilities for Bayesian Networks in Vision," Proceedings of the ARPA IU Workshop, 1994, Vol. 1, pp. 633–643. The work done by Ramesh et al., places an emphasis on performance characterization of a system, while Mann and Binford attempted Bayesian inference (using Bayesian networks) for visual recognition. The idea of gradual pruning of candidate hypotheses to tame the computational complexity of the estimation/classification problem has been presented by Y. Amit and D. Geman, "A computational model for visual selection," Neural Computation, 1999. However, none of the works identify how the sub-tasks (e.g., feature extraction steps) can be chosen automatically given an application context.

Therefore, a need exists for a method and apparatus for a computationally efficient, real-time camera surveillance system with defined computational and accuracy constraints.

SUMMARY OF THE INVENTION

The present invention relates to computer vision systems, more particularly to a system having computationally efficient real-time detection and zooming capabilities.

According to an embodiment of the present invention, by choosing system modules and performing an analysis of the influence of various tuning parameters on the system a method according to the present invention performs proper statistical inference, automatically set control parameters and quantify limits of a dual-camera real-time video surveillance system. The present invention provides continuous high resolution zoomed in image of a person's head at any location in a monitored area. Preferably, an omni-directional camera video used to detect people and to precisely control a high resolution foveal camera, which has pan, tilt and zoom capabilities. The pan and tilt parameters of the foveal camera and its uncertainties are shown to be functions of the underlying geometry, lighting conditions, background color/contrast, relative position of the person with respect to both cameras as well as sensor noise and calibration errors. The uncertainty in the estimates is used to adaptively estimate the zoom parameter that guarantees with a user specified probability, $\forall$, that the detected person's face is contained and zoomed within the image.

The present invention includes a method for selecting intermediate transforms (components of the system), as well as processing various parameters in the system to perform statistical inference, automatically setting the control parameters and quantifying a dual-camera real-time video surveillance system.

Another embodiment of the present invention relates to a method for visually locating and tracking an object through a space. The method chooses modules for a restricting a search function within the space to regions with a high probability of significant change, the search function operating on images supplied by a camera. The method also derives statistical models for errors, including quantifying an indexing step performed by an indexing module, and tuning system parameters. Further, the method applies a likelihood model for candidate hypothesis evaluation and object parameters estimation for locating the object.

The step of choosing the plurality of modules further includes applying a calibration module for determining a static scene, applying an illumination-invariant module for tracking image transformation, and applying the indexing module for selecting regions of interest for hypothesis generation. Further, the method can apply a statistical estimation module for estimating a number of objects and their positions, and apply a foveal camera control module for estimating control parameters of a foveal camera based on location estimates and uncertainties.

Additional modules can be applied by the method, for example, a background adaptation module for detecting and tracking the object in dynamically varying illumination situations.

Each module is application specific based on prior distributions for imposing restrictions on a search function. The prior distributions includes for example: an object geometry model; a camera geometry model; a camera error model; and an illumination model.

According to an embodiment of the present invention the camera is an omnicamera. Further, the object is tracked using a foveal camera.

The method derives statistical models a number of times to achieve a given probability of misdetection and false alarm rate. The method also validates a theoretical model for the space monitored for determining correctness and closeness to reality. The indexing module selects regions with a high probability of significant change, motivated by two dimensional image priors induced by prior distributions in the space, where the space is in three dimensional.

The method of applying a likelihood model includes estimating an uncertainty of the object's parameters for predicting a system's performance and for automating control of the system.

In an alternative embodiment the method can be employed in an automobile wherein the space includes an interior compartment of the automobile and/or the exterior of the automobile.

In yet another embodiment of the present invention, a computer program product is presented. The program product includes a computer program code stored on a computer readable storage medium for, for detecting and tracking objects through a space. The computer program product includes computer readable program code for causing a computer to choose modules for a restricting search functions within a context to regions with a high probability of significant change within the space. The computer program product also includes computer readable program code for causing a computer to derive statistical models for errors, including quantifying an indexing step, and tuning system parameters. Further included is computer readable program code for causing a computer to apply a likelihood model for candidate hypothesis evaluation and object parameters estimation within the space.

BRIEF DESCRIPTION OF THE DRAWINGS

Preferred embodiments of the present invention will be described below in more detail with reference to the accompanying drawings.

Throughout the diagrams, like labels in different figures denote like or corresponding elements or relationships. Further, the drawings are not to scale.

DETAILED DESCRIPTION OF PREFERRED EMBODIMENTS

Figure 1:
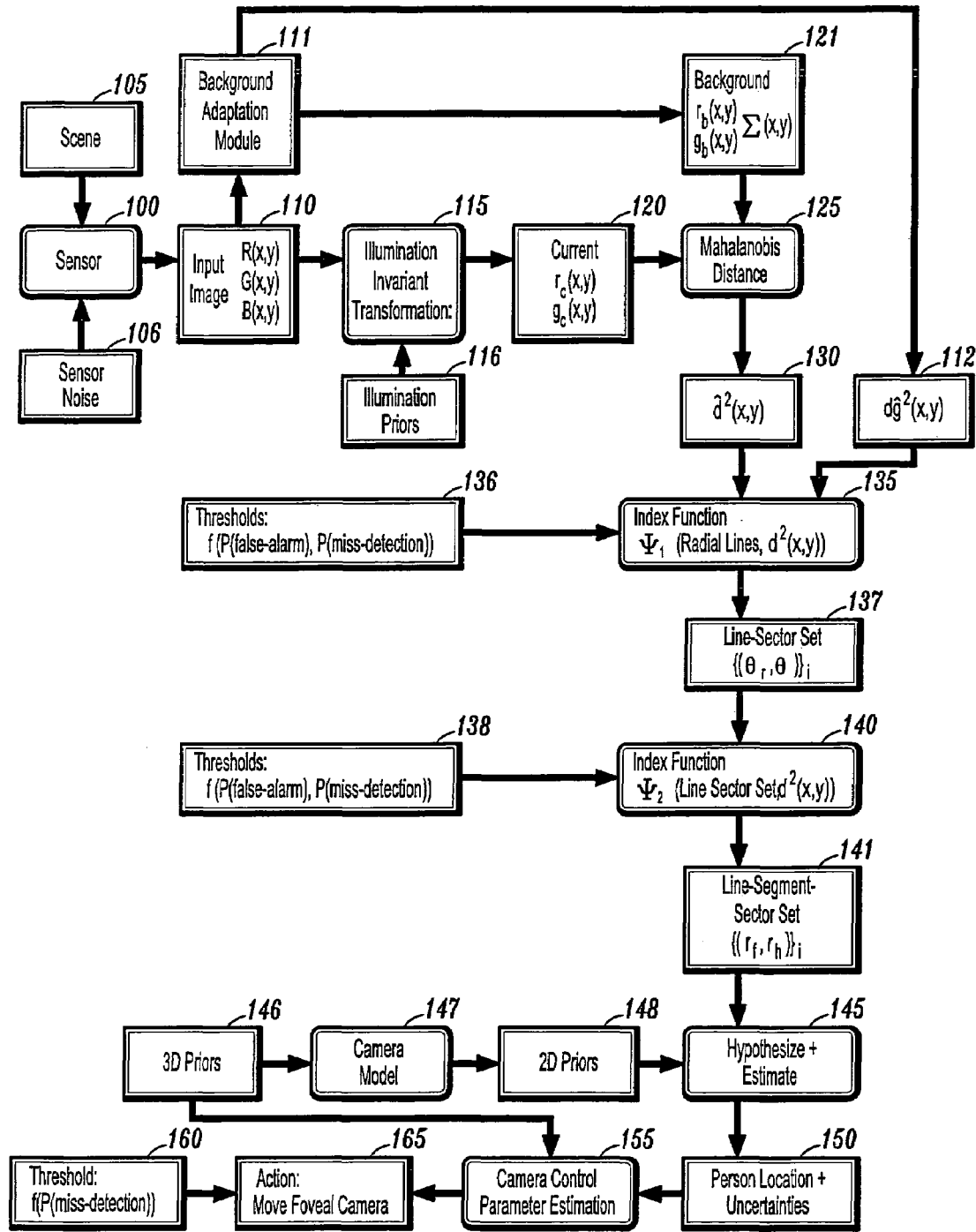
FIG. 1 is a block diagram showing a method for tracking an object through a space according to one embodiment of the present invention.

The present invention solves the problems existing in the prior art described above, based on the following methods.

System Configuration choice: According to one embodiment of the present invention, modules are chosen for an optical surveillance system, by use of context, in other words: application specific prior distributions for modules. These modules can include, for example, object geometry, camera geometry, error models and illumination models. Real-time constraints are imposed by pruning or indexing functions that restrict the search space for hypotheses. The choice of the pruning functions is derived from the application context and prior knowledge. A proper indexing function will be one that simplifies computation of the probability of false hypothesis or the probability of missing a true hypotheses as a function of the tuning constraints.

Statistical modeling and Performance Characterization: According to an aspect of the present invention, the derivation of statistical models for errors at various stages in the chosen vision system configuration assists in quantifying the indexing step. The parameters are tuned to achieve a given probability of miss-detection and false alarm rate. In addition, a validation of theoretical models is performed for correctness (through Monte-Carlo simulations) and closeness to reality (through real experiments).

Hypotheses verification and parameter estimation: Bayesian estimation is preferably used to evaluate candidate hypotheses and estimate object parameters by using a likelihood model, P (measurements/hypothesis), that takes into account the effects of the pre-processing steps and tuning parameters. In addition, the uncertainty of the estimate is derived to predict system performance.

One embodiment of the present invention includes a two camera surveillance system which continuously provides zoomed in high resolution images of the face of a person present in a room. These images represent the input to higher-level vision modules, e.g., face recognition, compaction and event-logging.

In another embodiment, the present invention provides: 1) real-time performance on a low-cost PC, 2) person misdetection rate of $\pi_m$, 3) person false-alarm rate of $\pi_f$, 4) adaptive zooming of person irrespective of background scene structure with maximal possible zoom based on uncertainty of person attributes estimated (e.g., location in three dimensional (3D), height, etc.), with performance of the result characterized by face resolution attainable in area of face pixel region (as a function of distance, contrast between background and object, and sensor noise variance and resolution) and bias in the centering of the face. In addition, the method makes assumptions about scene structure, for example, the scene illuminate consists of light sources with similar spectrum (e.g., identical light sources in an office area), the number of people to the detected and tracked is bounded, and the probability of occlusion of persons (due to other persons) is small.

Figure 2:
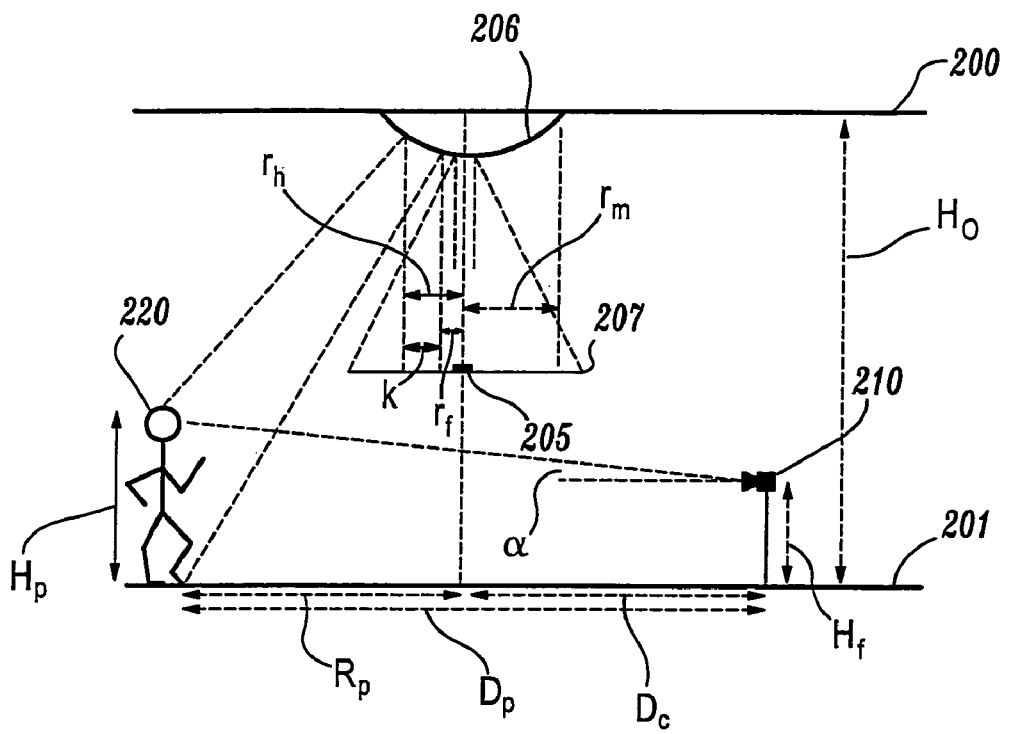
FIG. 2 is an illustration of a system of cameras for tracking a person according to one embodiment of the present invention.

Referring to FIG. 2, to continuously monitor an entire scene, the present invention uses an omnidirectional sensor including a omni-camera 205 and a parabolic mirror 206, for example, the OmniCam of S. Nayer, "Omnidirectional Video Camera," Proceedings of the DARPA Image Understanding Workshop, Vol. 1, pp. 235–242, 1997. This camera is preferably mounted below the ceiling 200 looking into the parabolic mirror located on the ceiling. The parabolic mirror 206 enables the camera 205 to see in all directions simultaneously. Note that FIG. 2 is an illustration of one embodiment of the present invention. Other embodiments are contemplated, including, for example, different mirror alignments, alternative camera designs (including, for example, catadioptric stereo, panoramic, omni, and foveal cameras), varying the orientation of the cameras and multiple cameras systems. The present invention can be employed using a verity of cameras, calibration modules (discussed below) including a combination of real world and image measurements, compensate for different perspectives.

The present invention uses omni-images to detect and estimate the precise location of a given person's foot in the room and this information is used to identify the pan, tilt and zoom settings for a high-resolution foveal camera. An omni-image is the scene as viewed from the omni-camera 205, typically in conjunction with a parabolic mirror 206, mounted preferably on the ceiling 200.

According to one embodiment of the present invention, the choice of the various estimation steps in the system is motivated from image priors and real-time requirements. The camera control parameters, e.g., pan and tilt, are selected based on the location estimate and its uncertainty (that is derived from statistical analysis of the estimation steps) so as to center the person's head location in the foveal image. The zoom parameter is set to maximum value possible so that the camera view still encloses the persons head within the image.

The general Bayesian formulation of the person detection and location estimation problem does not suit the real-time constraints imposed by the application. In one embodiment of the present invention, this formulation is used only after a pruning step. The pruning step rules out a majority of false alarms by designing an indexing step motivated by the two dimensional (2D) image priors (region size, shape, intensity characteristics) induced by the prior distribution in the 3D scene. The prior distributions for person shape parameters, including, for example, size, height, and his/her 3D location, are reasonably simple. These priors on the person model parameters induce 2D spatially variant prior distributions in the projections, e.g., the region parameters for a given person in the image depends on the position in the image, whose form depends on the camera projection model and the 3D object shape. In addition to shape priors, the image intensity/color priors can be used in the present invention.

Typically, a method according to the present invention does not make assumptions about the object intensity, e.g., the homogeneity of the object since people can wear variety of clothing and the color spectrum of the light source is therefore not constrained. However, in an alternative embodiment, in a surveillance application, the background is typically assumed to be a static scene (or a slowly time varying scene) with known background statistics. Gaussian mixtures are typically used to approximate these densities. To handle shadowing and illumination changes, these distributions are computed after the calculation of an illumination invariant measure from a local region in an image. The prior distribution of the spectral components of the illuminants are assumed to have same but unknown spectral distribution. Further, the noise model for CCD sensor noise 106 can be specified. This is typically chosen to be i.i.d. zero mean Gaussian noise in each color band.

In one embodiment of the present invention, the system preferably includes five functional modules: calibration, illumination-invariant measure computation at each pixel, indexing functions to select sectors of interest for hypothesis generation, statistical estimation of person parameters (e.g., foot location estimation), and foveal camera control parameter estimation.

Referring to FIG. 1, block diagram of the transformations applied to the input. A sensor 100, for example, an omnidirectional camera, records a scene 105, which preferably is recorded as a color image, the scene 105 is sent to input 110 as: $\hat{R}(x,y), \hat{G}(x,y), \hat{B}(x,y)$ The sensor is also subject to sensor noise 106 which will become part of the input 110.

The input 110, defined above, is transformed 115 ($T:R^3 \to R^2$), typically to compute an illumination invariant measure $\hat{r}_c(x,y), \hat{g}_c(x,y)$ 120. The statistical model for the distribution of the invariant measure is influenced by the sensor noise model and the transformation T(.). The invariant measure mean $(B_o(X,y)=(r_b(x,y),g_b(x,y)))$ and covariance matrix $\Sigma_{B_o}(x,y)$, is computed at each pixel (x,y) from several samples of R(x,y), G(x,y), B(x,y) for the reference image 121 of the static scene. A change detection measure $d^2(x,y)$ image 130 is obtained by computing the Mahalanobis distance 125 between the current image data values $\hat{r}_c(x,y)\hat{g}_c(x,y)$ and the reference image data $B_0(x,y)$. This distance image is used as input to two indexing functions $P_1(\ )$ 135 and $P_2(\ )$ 140. $P_1(\ )$ 135 discards the radial lines 2 by choosing hysteresis thresholding parameters 136 that satisfy a given combination of probability of false alarm and miss-detection values, passing the results 137 to $P_2(\ )$ 140. $P_2(\ )$ 140 discards segments along the radial lines in the same manner, by choosing hysteresis thresholding parameters 138. The result is a set of regions with high probability of significant change 141. At this point the method employs a full blown statistical estimation technique 145 that uses the 3D model information 146, camera geometry information 147, priors 148 (including objects, shape, and 3D location), to estimate the number of objects and their positions 150. The method preferably estimates the control parameters 155 for the foveal camera based on the location estimates and uncertainties. Accordingly, the foveal camera is directed by the control parameters and hysteresis thresholding parameters, for example, a miss-detection threshold.

Additional modules are contemplated by the present invention. For example, a background adaptation module 111. To generalize the system and cover outdoor and hybrid illumination situations (indoor plus outdoor illumination) as well as slow varying changes in the static background scene, the present invention incorporates a scheme described in "Adaptive background mixture models for real-time tracking", Chris Stauffer, W. E. L. Grimson (Proceedings of the CVPR conference, 1999), incorporated herein by reference. It can be shown qualitatively that the statistics for background pixels can be approximated by a Gamma distribution. The statistics are stable within a given time window. In the present invention the background adaptation module is fused with the system, without changing the entire analysis and algorithm. By re-mapping the test-statistic derived from the data, so that the cumulative density function of the re-mapped test-statistic approximates the cumulative density function of a Chi-square distribution. Therefore, the result of the Grimson-approach is re-mapped pixelwise to obtain $d\hat{g}^2$ in block 112, following the transform described below. By adding $d\hat{g}^2$ 112 (for each pixel) to the $d^2$ value 130 (see equ. 7), a new distance image is obtained. This distance image can be input to the index function 135.

The output of the background adaptation module 111 is also used to update the static background statistics, as shown in block 121.

The distribution of pixels of the new distance measurement are also Chi-square distributed. The only difference is a rise in the degree of freedoms from two to three. The analysis remains the same, the thresholds are derived as described below. This is an illustration of how different modules can be fused in an existing framework without changing the statistical analysis. After reading the present invention, formulation of these additional modules will be within the purview of one ordinary skilled in the art.

Figure 3:
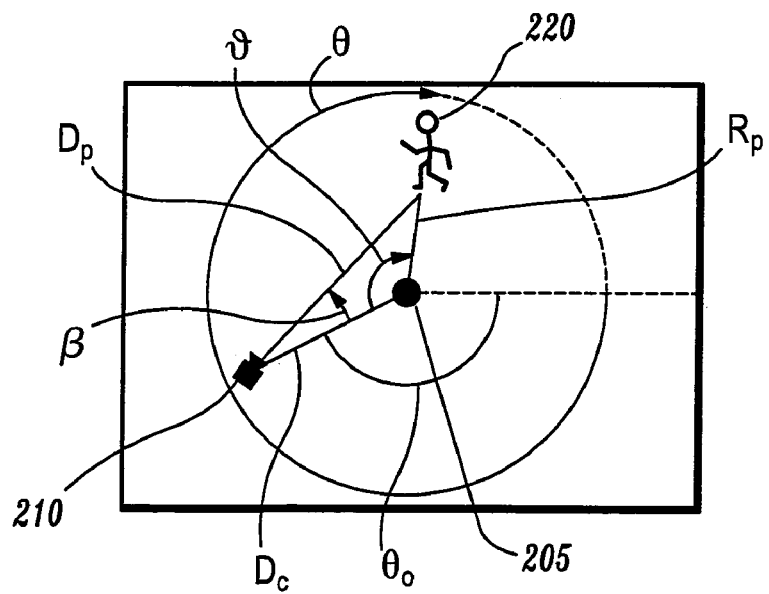
FIG. 3 is an illustration of an omni-image including the geometric relationships between elements of the system while tracking a person according to one embodiment of the present invention.

The projection model for the two cameras is discussed below with respect to FIGS. 2 through 5. The following geometric model parameters are denoted as:

$H_o$ height of OmniCam above floor (inches)
$H_f$ height of foveal camera above floor (inches)
$H_p$ person's height (inches)
$R_h$ person's head radius (inches)
$R_f$ person's foot position in world coordinates (inches)
$D_c$ on floor projected distance between cameras (inches)
$p(x_c,y_c)$ position of OmniCam center, (in omni-image) (pixel coordinates)
$r_m$ radius of parabolic mirror (in omni-image)(pixels)
$r_h$ distance person's head—(in omni-image)(pixels)
$r_f$ distance person's foot—(in omni-image)(pixels)

η—angle between the person and the foveal camera relative to the OmniCam image center (Please see FIG. 3).

ϑ—angle between the radial line corresponding to the person and the zero reference line (please see FIG. 3).

Where capital variables are variables in 3D, and small variables are given in image coordinates. During the calibration step (combination of real world and image measurements) $H_o$, $H_p, D_c, r_m$ and $p(x_c, y_c)$, are initialized and the corresponding standard deviations or tolerances are determined. In a preferred embodiment the calibration step is performed offline. Heights are typically calculated from the floor 201 up.

Using the geometric features of an OmniCam 205, including a parabolic mirror, and under the hypothesis that the person 220 is standing upright, the relationship between $r_f$ respectively $r_h$ and $R_p$ can be shown to be:

$$R_p = aH_o \quad a = 2\frac{r_m r_f}{r_m^2 - r_f^2} \text{ with} \quad (1)$$

$$R_p = b(H_o - H_p) \quad b = 2\frac{r_m r_h}{r_m^2 - r_h^2} \text{ with} \quad (2)$$

Let ∀, and ∃ be the foveal camera 210 control parameters for the tilt and pan angles respectively. Further, $D_p$, the projected real world distance between the foveal camera 210 and the person 220. Assuming, the person's head is approximately located over his/her feet, and using basic trigonometry in FIGS. 2 and 3, it can easily be seen that $D_p$, ∀, and ∃ are equal to:

$$D_p = \sqrt{D_c^2 + R_p^2 - 2D_c R_p \cos(\Theta)} \quad (3)$$

$$\tan(\forall) = \frac{H_p - R_h - H_f}{D_p}; \quad \sin(\beta) = \frac{R_p}{D_p}\sin(\vartheta) \quad (4)$$

where Θ is the angle between the person 220 and the foveal camera 210 relative to the OmniCam 205 position.

This step is the module that takes in as input, the current color image ($\hat{R}(X,y), \hat{G}(x,y), \hat{B}(x,y)$), normalizes it to obtain ($\hat{r}_c(x,y), \hat{g}_c(x,y)$) and compares it with the background statistical model ($B_o(x,y), \Sigma_{B_o}(x,y)$) to produce an illumination invariant measure image $\hat{d}^2(x,y)$. This section illustrates the derivation of the distribution of $\hat{d}^2(x,y)$ given that the input image measurements $\hat{R}, \hat{G}$ and $\hat{B}$ are Gaussian with mean R,G,B, and identical standard deviation Φ.

With respect to FIG. 1, the illumination prior assumption 116, is that the scene contains multiple light sources with the same spectral distribution with no constraint on individual intensities. To compensate for shadows which are often present in the image, the method employs a shadow invariant representation of the color data. The invariant representation is according to G. Wyszecki and W. S. Stiles "Color Science: Concepts and Methods, Quantitative Data and Formulae," John Wiley & Son, 1982 incorporated herein by reference. Accordingly, let S=R+G+B. The illumination normalizing transform $T:R^3 \rightarrow R^2$ appropriate for the method's assumptions is:

$$r = \frac{R}{R+G+B}, \quad g = \frac{G}{R+G+B}.$$

It can be shown that, the uncertainties in the normalized estimates $\hat{r}$ and $\hat{g}$ are dependent not only on sensor noise variance, but also on the actual true unknown values of the underlying samples (due to the non-linearities in the transformation T(.)). Based on the assumption of a moderate signal to noise ratio (i.e., Φ<<S), the method approximates $(\hat{r}, \hat{g})^T$ as having a normal distribution with pixel-dependent covariance matrix $$\begin{pmatrix} \hat{r} \\ \hat{g} \end{pmatrix} = \begin{pmatrix} \frac{R + \eta_R}{S + \eta_R + \eta_G + \eta_B} \\ \frac{G + \eta_R}{S + \eta_R + \eta_G + \eta_B} \end{pmatrix} \sim N\left( \begin{pmatrix} r \\ g \end{pmatrix}, \sum_{\hat{r}, \hat{g}} \right)$$

with $\sum_{\hat{r},\hat{g}} = \frac{\sigma^2}{S^2} \begin{pmatrix} 1 - \frac{2R}{S} + 3\frac{R^2}{S^2} & -\frac{R+G}{S} + 3\frac{RG}{S^2} \\ -\frac{R+G}{S} + 3\frac{RG}{S^2} & 1 - \frac{2G}{S} + 3\frac{G^2}{S^2} \end{pmatrix}$ (5)

The values of $$\sigma_{\hat{r},\hat{r}}^2, \sigma_{\hat{g},\hat{g}}^2, \text{ and } \sigma_{\hat{r},\hat{g}}^2$$

are determined offline for an entire OmniCam 205 frame, e.g., for each point or pixel on the image plane 207. These points vary spatially. Note, that in the normalized space the covariance matrix for each pixel is different: Bright regions in the covariance image correspond to regions with high variance in the normalized image. These regions correspond to dark regions in RGB space.

Since the covariance matrices in the normalized space are pixel-dependent, a method according to the present invention calculates the test statistic, i.e., the Mahalanobis distance $\hat{d}^2$, that provides a normalized distance measure of a current pixel being background. Let $\hat{\mu}_b$ be the vector of mean $r_b$, and mean $g_b$ at a certain background position (mean $b_b$ is redundant, due to normalization), and $\hat{\mu}_c$ be the corresponding vector of the current image pixel. Since $$\begin{pmatrix} \hat{r}_c - \hat{r}_b \\ \hat{g}_c - \hat{g}_b \end{pmatrix} \sim N\left( \begin{pmatrix} r_c - r_b \\ g_c - g_b \end{pmatrix}, \Sigma_{\hat{r}_c,\hat{g}_c} + \Sigma_{\hat{r}_b,\hat{g}_b} \right) \quad (6)$$

the method can define, for each pixel, a metric $\hat{d}^2$ which corresponds to the probability, that $\hat{\mu}_c$ is background pixel:

$$\hat{d}^2 = (\hat{\mu}_b - \hat{\mu}_c)^T (2\Sigma_{\hat{r}_b,\hat{g}_b})^{-1} (\hat{\mu}_b - \hat{\mu}_c) \quad (7)$$

For background pixels, $\hat{d}^2$ is approximately $\chi^2$ distributed with two degrees of freedom. For object pixels $\hat{d}^2$ happens to be non-central $\chi^2$ distributed with two degrees of freedom, and non-centrality parameter c.

To address real-time computational requirements of the application the method identifies sectored segments in the image that potentially contains people of interest. To perform this indexing step in a computational efficient manner the method defines two index functions $P_1( )$ and $P_2( )$ that are applied sequentially as shown in FIG. 1. Essentially $P_1( )$ and $P_2( )$ are projection operations. For instance, define $d^2(R,\theta)$ as the change detection measure image in polar coordinates with coordinate system origin at the omni-image center $p(x_c,y_c)$. Then, $P_1( )$ is chosen to be the projection along radial lines to obtain $\hat{M}_\theta$, the test statistic that can be used to identify changes along a given direction 2. This test statistic is justified by the fact that the object projection is approximated by a line-set (approximated as an ellipse) whose major axis passes through the omni-image center with a given length distribution that is a function of the radial foot position coordinates of the person in the omni-image. This section derives the expressions for the probabilities of false alarm and misdetection at this step as a function of the input distributions for $d^2(R,\theta)$, the prior distribution for the expected fraction of the pixels along a given radial line belonging to the object, and the noncentrality parameter of $d^2(R,\theta)$ in object locations.

Let $L_\theta^{x_c,y_c}$ be a radial line trough $p(x_c,y_c)$ parameterized by angle 2, and $\hat{M}(\theta)=\Sigma_r d_\theta^2(r)$ denote the accumulative measure of $d^2$ values at image position $p(\theta,r)$ parameterized by angle 2 and distance r in a polar coordinate system at $p(x_c,y_c)$. Applying Canny's hysteresis thresholding technique on $\hat{M}(\theta)$, provides the sectors of significant change bounded by left and right angles $2_l$ respectively $2_r$. Let $r_m$ be the total number of pixels along a radial line $L_\theta^{x_c,y_c}$, and k be the expected number of object pixels along this line. The distribution of k can be derived from the projection model and the 3D prior models for person height, size, and position described previously. The distribution of the cumulative measure is:

Background $M_q c_{2r_m}^2(0)$ (8)

Object $M_q \sim (r_m-k)c_{2(r_m-k)}(0)+kc_{2k}^2(c)$ (9)

with $c \in [0 \ldots \inf)$.

To obtain a false-alarm rate for false sectors of equal or less than $x_f \%$ the method can set the lower threshold $T_l$ so that $$\int_0^{T_1} \chi_{\hat{M}_\theta}^2(\varepsilon)d\varepsilon = 1 - x_f \%$$ (10)

To guarantee a misdetection rate of equal or less than $x_m \%$, theoretically, the method can solve for an upper threshold T, similarly by evaluating the distribution in object equation above. Note that k is a function of $H_p$, $R_p$, and c. Therefore, the illustrative method would need to know the distributions of $H_p$, $R_p$, and c to solve for $T_u$. Rather then make assumptions about the distribution of non-central parameter c, the method uses LUT $T_u(x_m)$ generated by simulations instead.

The second index function $P_2( )$ essentially takes as input the domain corresponding to the radial lines of interest and performs a pruning operation along the radial lines R. This is done by the computation of $\bar{d}_{\theta_f}^2(r)$ the integration of the values $d^2( )$ along $2_f=2+\pi/2$ (within a finite window whose size is determined by the prior density of the minor axis of the ellipse projection), for each point r on the radial line 2. The derivation of the distribution of the test statistic and the choice of the thresholds are exactly similar to the above step.

The illustrative method derives the distributions of the $\bar{d}^2$ image measurements, and has narrowed the hypotheses for people location and attributes. The method performs a Bayes estimation of person locations and attributes. This step uses the likelihood models $L(\bar{d}^2|background)$ and $L(\bar{d}^2|object)$ along with 2D prior models for person attributes induced by 3D object priors $P(R_p)$, $P(H)$, $P(2)$ and $P(S)$. The present embodiment uses the fact that the probability of occlusion of a person is small to assert that the probability of a sector containing multiple people is small. The center angle $2_f$ of a given sector would in this instance provide the estimate of the major axis of the ellipse corresponding to the person. It is then sufficient to estimate the foot location of person along the radial line corresponding to $2_f$. The center angle $2_f$ of the sector defines the estimate for the angular component of the foot position. The illustrative method approximates $\hat{\theta}_f$ to be normal distributed with unknown $2_f$ and variance $\sigma\theta_f$. $2_f$'s are estimated as the center positions of the angular sectors given by $P_1( )$. The standard deviation of a given estimate can be determined by assuming that the width of the angular sector gives the 99 percentile confidence interval. Alternatively, this estimation can be obtained through sampling techniques.

Given the line $2_f$ it is necessary to estimate the foot position of the person along this radial line. To find this estimate and variance of the radial foot position $r_f$ the method chooses the best hypothesis for the foot position that minimizes the Bayes error. Let $P(h_i|m)$ denote the posterior probability to be maximized, where $h_i$ denotes the ith out of multiple foot position hypotheses and m the measurements $(\bar{d}_{\theta_f}^2(r))$, that are statistically independent; hyper-script b or o denotes background respectively object:

$$P(h_i|m) = P(h_i^b|m^b)P(h_i^o|m^o) = P(h_i^b|m^b)(1 - P(\bar{h}_i^o|m^o)) = \quad (11)$$

$$\frac{p(m^b|h_i^b)P(h_i^b)}{p(m^b)} \frac{p(m^o) - p(m^o|\bar{h}_i^o)P(\bar{h}_i^o)}{p(m^o)}$$

where p denotes the density function. $P(h_i^*m)$ becomes maximal for maximal $p(m^b|h_i^b)$ and minimal $p(m^o|\bar{h}_i^o)$, so that $$r_f = \underset{r_f'}{\arg\max} \log\left(\frac{p(m^b|h_i^b)}{p(m^o|\bar{h}_i^o)}\right) = \quad (12)$$

$$\underset{r_f'}{\arg\max}\left(\sum_{r=0}^{r_f'-1} \bar{d}_{\theta_f}^2(r) + \sum_{r=r_h(r_f')}^{r_m} \bar{d}_{\theta_f}^2(r) - \sum_{r=r_f}^{r_h(r_f')-1} \bar{d}_{\theta_f}^2(r)\right)$$

In one embodiment of the present invention, an estimate of the uncertainty in the foot position $r_f$ is made. The method provides pdf's up to the latest step in the algorithm. At this point it is affordable to simulate the distribution of $r_f$ and generate $\sigma_{r_f}^2$ via perturbation analysis, since only few estimates with known distributions are involved in few operations. The method can approximate $\hat{r}_f$ as Gaussian distributed with unknown mean $r_f$ and variance $\sigma_{r_f}^2$.

Once the foot position $P(\theta_f, r_f)$ is known, the method can apply formula 1 through 4 above, to estimate 3D distances $R_p$, $D_p$, and foveal camera control parameter tilt $\forall$, pan $\exists$ and zoom factor z.

Figure 5:
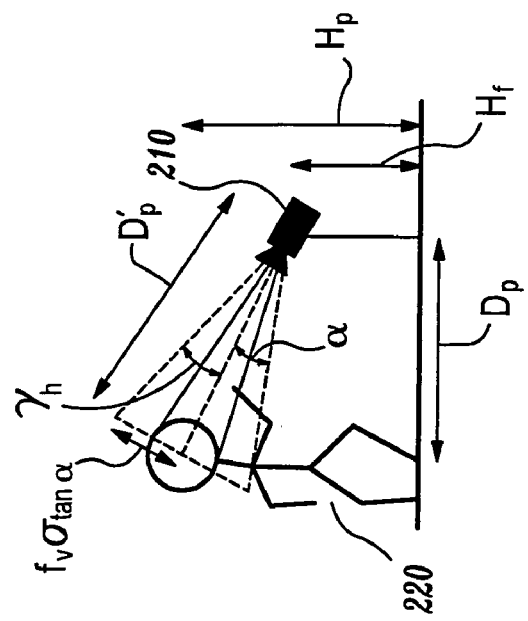
FIG. 5 is an illustration of the geometric relationship between a foveal camera and a person.
Figure 4:
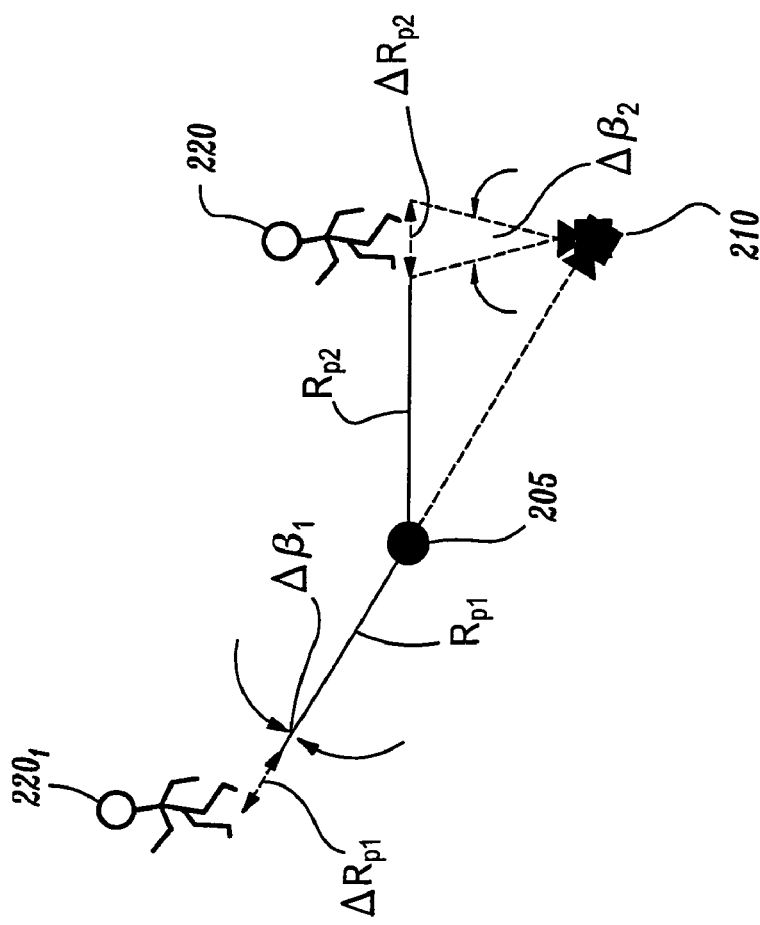
FIG. 4 is an illustration of how uncertainties in three dimensional radial distances influence foveal camera control parameters.

FIGS. 4 and 5 illustrate how uncertainties in 3D radial distance $R_p$ influence the foveal camera control parameters. For the following error propagation steps the method assumes that $\hat{r}_m, \hat{r}_p, \hat{H}_o, \hat{H}_p, \hat{H}_f$ and $\hat{D}_c$ are Gaussian random variables with true unknown means $r_m, r_p, H_o, H_p, R_h, H_f$ and $D_c$, and variances $\sigma_{f_m}^2, \sigma_{f_p}^2, \sigma_{\hat{H}_o}^2, \sigma_{\hat{H}_g}^2, \sigma_{\hat{R}_h}^2, \sigma_{\hat{H}_f}^2$ and $\sigma_{\hat{D}_c}^2$ respectively (all estimated in the calibration phase). The estimates and it's uncertainties propagate through the geometric transformations. The method produces the final results for the uncertainties in tilt ∀, and pan ∃, which were used to calculate the zoom parameter z. (for more details, and derivations of $\sigma_{\hat{R}_p}^2, \sigma_{\hat{D}_p}^2$ see M. Greiffenhagen and V. Ramesh, "Auto-Camera-Man: Multi-Sensor Based Real-Time People Detection and Tracking System," Technical Report, Siemens Corporate Research, Princeton, N.J., USA, November 1999.):

$$\sigma_{\tan\hat{\alpha}}^2 = \quad (13)$$
$$\frac{\sigma_{\hat{D}_p}^2}{D_p^4}\left((H_p - R_h - H_f)^2 + \sigma_{\hat{H}_p}^2 + \sigma_{\hat{R}_h}^2 + \sigma_{\hat{H}_f}^2\right) + \frac{\sigma_{\hat{H}_p}^2 + \sigma_{\hat{R}_h}^2 + \sigma_{\hat{H}_f}^2}{D_p^2}$$

$$\sigma_{\sin\hat{\beta}}^2 = \quad (14)$$
$$\frac{R_p^2 \sigma_{\hat{\theta}}^2 \cos^2 v}{D_p^2} + (\sin^2 v + \sigma_{\hat{v}}^2 \cos^2 v) * \left(\frac{R_p^2 \sigma_{\hat{D}_p}^2}{D_p^4} + \frac{\sigma_{\hat{R}_p}^2}{D_p^2} + \frac{\sigma_{\hat{R}_p}^2 \sigma_{\hat{D}_p}^2}{D_p^4}\right)$$

Given the uncertainties in the estimates, the method derives the horizontal and vertical angle of view for the foveal camera, $\gamma_h$ respectively $\gamma_v$, which map directly to the zoom parameter z. FIGS. 4 and 5 show the geometric relationships for the vertical case. Following equation provides the vertical angle of view.

$$\gamma_v = 2a \tan\left(\frac{\hat{R}_h + f_v \sigma_{\tan\hat{\alpha}} \hat{D}'_p}{\sqrt{\hat{R}_h^2 + \hat{D}'^2_p}}\right) \text{ with } \hat{D}'_p = \frac{\hat{D}_p}{\cos\alpha} \quad (15)$$

where factor $f_v$ solves for $$\int_0^{\frac{f_v}{2}} N(0,1) d\xi = \frac{x_z}{2}\%$$

given user specified confidence percentile $x_z$ that the head is display in the foveal frame. Similar derivations apply for the horizontal case.

The method verifies the correctness of the theoretical expressions and approximations through extensive simulations. only show plots validating expressions for illumination normalization (eqn. 5), and for foveal camera control parameters (eqn. 13, 14). This validation assumes correctness of the underlying statistical models. Validation of the models on real data is discussed below.

The correctness of the models is verified by comparing ground truth values against module estimates for mean and variance of the running system. The following is an illustration of an embodiment of the present invention, eight positions P1–P8 are marked having different radial distances and pan angles. Positions and test persons were chosen to simulate different positions, illumination, and contrast. The table for the final foveal camera control parameters is for one person. Ground truth values for the mean values were taken by measuring tilt angle a, and pan angle b by hand, and are compared against the corresponding mean of system measurements estimated from 100 trials per position and person. The variances calculated from the system estimates for pan and tilt angle are compared against the average of the corresponding variance-estimates calculated based on the analysis. The comparison between system output and ground truth demonstrates the correctness of the model assumptions in the statistical modeling process (see Table 1).

Table 1: Validation: First two lines shows the predicted and experimental variances for the tilt angle, respectively. The next two lines correspond to pan angle.

TABLE 1

| | Validation: First two lines shows the predicted and experimental variances for the tilt angle, respectively. The next two lines correspond to pan angle. | | | | | | | |
|---|---|---|---|---|---|---|---|---|
| ×10⁻⁵ | P1 | P2 | P3 | P4 | P5 | P6 | P7 | P8 |
| $\hat{\sigma}_{\tan\hat{\alpha}}^2$ | 2.1 | 2.12 | 1.57 | 1.4 | 1.35 | 1.31 | 1.31 | 1.32 |
| $\hat{\sigma}_{\tan\hat{\alpha}}^2$ | 2.05 | 2.04 | 1.6 | 1.34 | 1.36 | 1.32 | 1.4 | 1.31 |
| $\hat{\sigma}_{\sin\hat{\beta}}^2$ | 28.9 | 26.1 | 21.3 | 17.9 | 15.3 | 15.2 | 18.4 | 20.1 |
| $\hat{\sigma}_{\sin\hat{\beta}}^2$ | 25.9 | 24.1 | 19.5 | 15.1 | 14.9 | 15 | 18.1 | 19.3 |

The performance of the running system will now be discussed. The output of the foveal camera is sufficient as input for face recognition algorithms. Illustrating how the statistical analysis is used to optimize the camera setup, equ. 13 and 14 suggest that the configuration that minimizes these uncertainties is the one with large inter-camera distance $D_c$ and foveal camera height $H_f$ equal to the mean person eye-level height Hp.

The present invention is reliable in terms of detection and zooming over longtime experiments within the operational limits denoted by the outer line of the upper right contour plot.

The setup of the system (for example, placement of foveal camera) influences precision globally and locally. Preferred directions of low uncertainties can be used to adapt the system to user defined accuracy constraints in certain areas of the room.

In another embodiment of the present invention, a system for monitoring in and around an automobile is presented. The inventions uses an omni-directional sensor (a standard camera plus a mirror assembly) to obtain a global view of the surroundings within and outside the automobile. The omni-camera video is used for detection and tracking of objects within and around the automobile. The concept is an extension of the methods described above with respect to tracking objects within a room. In this embodiment the system can be used to improve safety and security.

The video analysis system can include multiple modules. For example, a calibration module where the center of the Omni-camera image is used with height information of the ceiling of the automobile to translate image coordinates to ground plane coordinates. Where a CAD model of the automobile is available, the image coordinates can be mapped to a 3D point on the interior of the automobile using this calibration step (if the automobile is not occupied). Another example is a change detection module that compares a reference map (reference image plus variation around the reference image) to current observed image map to determine a pixel-based change detection measure. This is done by transforming the color video stream into normalized color space (to deal with illumination variation). The change detection measure is used to index into a set of possible hypothesis for object positions and locations. Yet another example includes a background update module for varying background conditions (e.g. gain control change, illumination changes). A grouping module that takes the change detection measure along with a geometric model of the environment and the objects to identify likely object locations. In the current embodiment, the method provides the areas in the image corresponding to the windows and model people by upright cylinders when they are outside of the automobile. In the interior of the automobile, people can be modeled by generalized cylinders. Still another module includes an object tracking module that takes location information over time to do prediction of object locations in the subsequent time step and to re-estimate their new locations. Preferably, the visualization is presented on a color liquid crystal display (LCD) panel mounted with the rear-view mirror. The visualization module presents geometrically warped video of the omni-cam video. This is useful for driver assistance (e.g. while the driver is backing up or when he/she is changing lanes). Other modules are contemplated by the present invention including, for example, a module that determines an approaching object's potential threat, e.g., at a higher rate of speed or from a particular direction.

According to the automotive embodiment of the present invention, the OmniCam is a catadioptric system that includes two parts: a parabolic mirror; and a standard CCD camera looking into it. The invention is useful as a sensor for use in driver assistance. It is also useful for monitoring the surroundings when the automobile is stationary and for recording videos in the event that a person approaches the automobile and attempts to get unauthorized access. The omni-camera system can be use in conjunction with a pan-tilt camera to enable the capture of a zoomed up image of the persons involved. Once a person gains unauthorized access to the automobile and an alarm is triggered, a security system integrating vision, global positioning system (GPS) and mobile phone, can transmit the time, location and the face image of the person to a central security agency. In addition to the monitoring capability, the ability to present the panoramic view of the surroundings provides a method to alert the driver to potential danger in the surrounding area by visually emphasizing the region in the panoramic view. In addition, due to the mounting position of the Omni-camera, looking up into a parabolic mirror located on the ceiling of the automobile (preferably centered), parts of the surroundings that are invisible to the driver are visible in the Omni-view. Thus, the driver blind spot area is significantly reduced. By evaluating the panoramic view it is possible to trigger warnings, e.g., if other cars enter a driver's blind spot. If automobile status information (speed, steering wheel position, predicted track) is combined with panoramic video processing it is possible to alert a driver to impending dangers or potential accidents.

The present invention contemplates a system and method for tracking an object. The invention can be employed in varying circumstances, for example, video conferencing, distance learning, and security stations where a user can define an area of interest there by replacing traditional systems employing banks of monitors. The present invention also contemplates an application wherein the system is used in conjunction with a data-log for recording time and location together with images of persons present. In a data-log application the system can associate an image with recorded information upon the occurrence of an event, e.g., a person sits at a computer terminal within an area defined for surveillance. The data-log portion of the system is preferably performed by a computer, where the computer records, for example, the time, location, and identity of the subject, as well as an accompanying image. The present invention is not limited to the above applications, rather the invention can be implemented in any situations where object detection, tracking, and zooming is needed.

Having described preferred embodiments of the present invention having computationally efficient real-time detection and zooming capabilities, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A method for visually locating and tracking an object through a space, comprising the steps of:
   restricting an area of the space to be searched to a plurality of regions with a high probability of significant change, the space being defined in images supplied by a camera;
   deriving statistical models for errors, including quantifying an indexing step performed by an indexing module, and tuning system parameters, wherein each statistical model is a candidate hypothesis for object location;
   applying a likelihood model for candidate hypothesis evaluation; and
   locating the object according to a candidate hypothesis evaluated to satisfy the likelihood model.

2. The method of claim 1, wherein restricting the area of the space to be searched further comprises the steps of:
   applying a calibration module for determining a static scene;
   applying an illumination-invariant module for tracking image transformation; and
   applying the indexing module for selecting regions of interest for hypothesis generation.

3. The method of claim 2, further comprising the steps of:
   applying a statistical estimation module for estimating a number of objects and their positions; and
   applying a foveal camera control module for estimating a plurality of control parameters of a foveal camera based on location estimates and uncertainties.

4. The method of claim 2, further comprising the step of applying a background adaptation module for detecting and tracking the object in dynamically varying illumination situations.

5. The method of claim 1, wherein an application specific module is provided based on a plurality of prior distributions for imposing restrictions on the candidate hypotheses.

6. The method of claim 5, wherein the plurality of prior distributions comprise:
   an object geometry model;
   a camera geometry model;
   a camera error model; and
   an illumination model.

7. The method of claim 1, wherein the camera is an omnicamera.

8. The method of claim 1, wherein the object is tracked using a foveal camera.

9. The method of claim 1, wherein the step of deriving statistical models is applied a plurality of times to achieve a given probability of misdetection and false alarm rate.

10. The method claim 9, further comprising the step of validating a theoretical model for the space monitored for determining correctness and closeness to reality.

11. The method of claim 1, wherein the indexing module selects a plurality of regions with a high probability of significant change, motivated by a plurality of two dimensional image priors induced by a plurality of prior distributions in the space, wherein the space is three dimensional.

12. The method of claim 1, further comprising estimating an uncertainty of the object's parameters for predicting a system's performance and for automating control of the system.

13. The method of claim 1, employed in an automobile wherein the space monitored comprises one of an interior compartment of the automobile and an exterior of the automobile.

14. The method of claim 1, wherein the candidate hypothesis evaluated that satisfies the likelihood model minimizes a Bayes error.

15. A computer program product comprising computer program code stored on a computer readable storage medium for, for locating and tracking objects through a space, the computer program product comprising:

computer readable program code for causing a computer to restrict an area of the space to be search to a plurality of regions with a high probability of significant change within the space;

computer readable program code for causing a computer to derive statistical models for errors, including quantifying an indexing step, and tuning system parameters, wherein each statistical model is a candidate hypothesis for object location;

computer readable program code for causing a computer to apply a likelihood model for candidate hypothesis evaluation; and computer readable program code for causing a computer to locate the object according to a candidate hypothesis evaluated to satisfy the likelihood model.

* * * * *